Patented Feb. 18, 1941

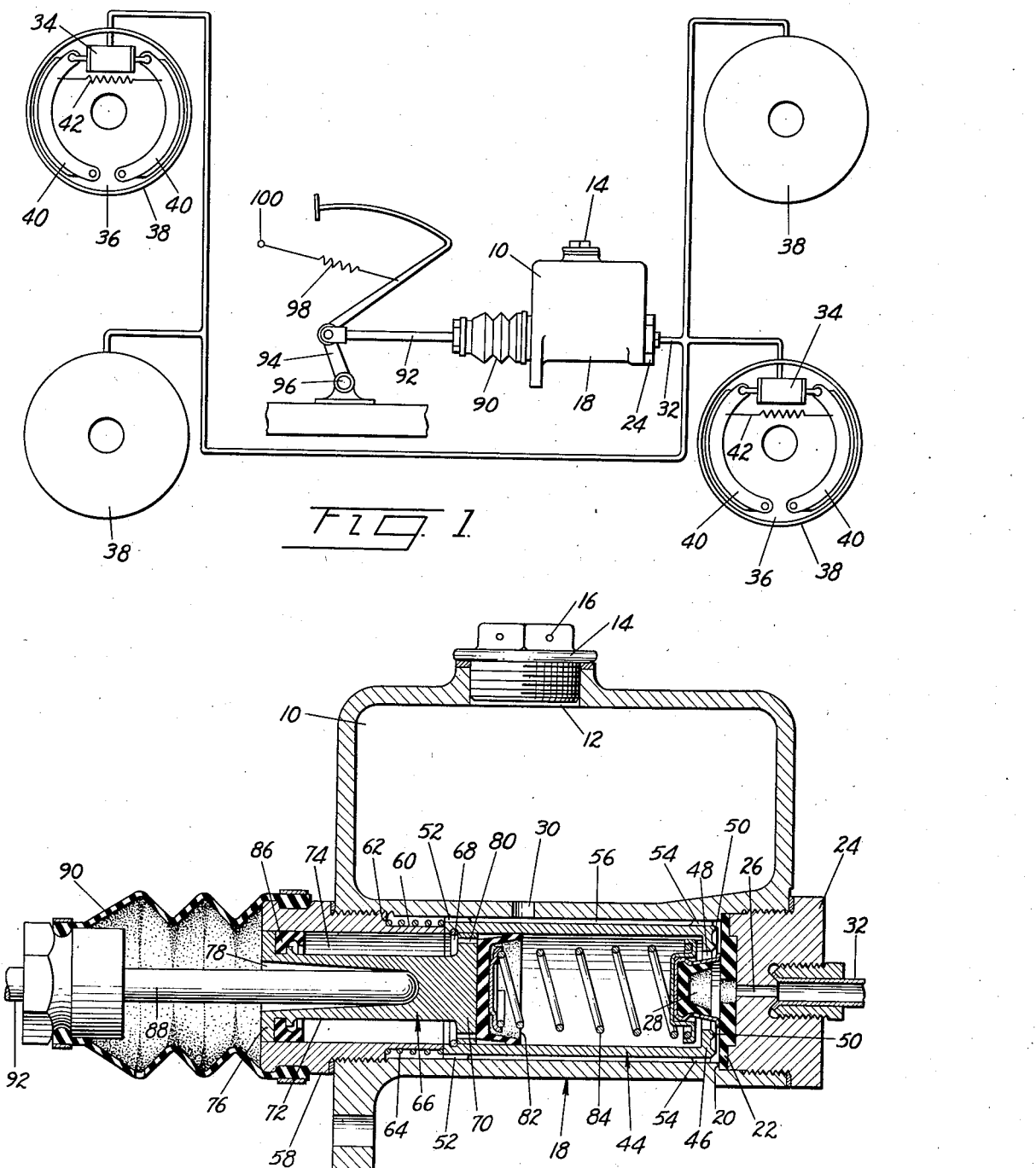

2,232,349

UNITED STATES PATENT OFFICE 2,232,349

FLUID PRESSURE BRAKING SYSTEM

Harvey C. Swift, Detroit, Mich., assignor to Hydraulic Brake Company, Detroit, Mich., a corporation of California Application July 18, 1938, Serial No. 219,869

9 Claims. (Cl. 60—54.6)

This invention relates to fluid pressure braking systems, and more particularly to fluid pressure producing devices for such systems.

Generally fluid pressure braking systems include a fluid pressure producing device comprising a reservoir, a cylinder supplied therefrom, and a piston movable in the cylinder for creating pressure. Invariably fluid pressure producing devices of this particular type are provided with means for inhibiting movement of fluid past the piston during its compression stroke, and such means is universally a flexible sealing cup supported on the head of the piston, and the cylinder has arranged in its wall immediately forward of the sealing cup, when the piston is in fully retracted position, a port communicating with the reservoir. This port provides for the flow of fluid into and from the cylinder, due to expansion and contraction of the fluid induced by temperature changes. Frequent movement of the sealing cup over the port when the cup is under pressure invariably results in injury to the cup, thus destroying the effectiveness of the device. The present invention aims to overcome this difficulty without destroying any of the many advantages found in fluid pressure producing devices of this type.

An object of the invention is to provide a fluid pressure producing device having relatively movable parts, a sealing means carried by one of the parts, and means for supplying fluid to the device and compensating for expansion and contraction of the fluid without injury to the sealing means.

Other objects and advantages of the invention will appear from the following description taken in connection with the accompanying drawing, and in which—

Fig. 1 is a schematic view of a fluid pressure system embodying the invention; and Fig. 2 is a vertical sectional view of the fluid pressure producing device.

Referring to the drawing for more specific details of the invention, 10 represents a reservoir having a filling opening 12 normally closed as by a plug 14 provided with openings 16 for venting the reservoir to the atmosphere. A cylinder 18 at the base of the reservoir has in one end thereof an annular shoulder 20 for the reception of a resilient washer 22 secured against displacement and supported by a head 24 fitted in the cylinder and provided with a discharge port 26 controlled as by a two-way valve 28, and arranged in the wall of the cylinder is a port 30 providing a communication between the cylinder and the reservoir.

A fluid pressure delivery pipe or conduit 32 connected to the discharge port 26 has branches connected respectively to fluid pressure actuated motors 34 preferably arranged in pairs, one pair for actuating the brakes associated with the front wheels of a vehicle, and another pair for actuating the brakes associated with the rear wheels of the vehicle.

The brakes may be of conventional type, each including a backing plate 36 adapted to be secured to an axle or to an axle housing, a rotatable drum 38 adapted to be secured to a wheel, a pair of corresponding interchangeable friction elements or shoes 40 mounted on the backing plate for cooperation with the drum, a retractile spring 42 connecting the shoes, and a fluid pressure actuated motor corresponding to the motors 34 mounted on the backing plate and connected to the shoes and operative to actuate the shoes into engagement with the drum against the resistance of the retractile spring.

A shell 44, open at one of its ends and closed at its other end by a head 46 provided with a concentric opening 48 and annular ribs or beads 50, has arranged thereon at the respective ends spaced lands 52 and 54 serving to support the shell for movement within the cylinder. The shell is supported concentrically of and in spaced relation to the wall of the cylinder so as to provide an annular passage 56 between the shell and the wall of the cylinder. The annular ribs 50 on the head of the shell are adapted to seat on the resilient washer 22 so as to close the passage 56, and the opening in the head receives the two-way valve 28 and has direct communication with the discharge port 26.

A sleeve 58 suitably secured in the open end of the cylinder has a bore complementary to the bore of the shell 44, and a reduced portion 60 providing an annular shoulder 62. A spring 64, sleeved on the reduced portion between the shoulder 62 and the adjacent edge of the shell 44, serves to urge the shell to its seat on the resilient washer 22 so as to provide a gap between the adjacent ends of the sleeve and the shell and to effectively seal the passage 56 between the shell and the cylinder.

A piston 66, reciprocable in the shell 44 and sleeve 58, is retained against displacement by a retaining ring 68 seated in a groove in the wall of the shell. The piston includes a head 70, a reduced body portion 72 providing in conjunction with the wall of the cylinder an annular chamber 74, and a skirt 76 provided with a socket 78 extended into the body portion. The head has therein a plurality of spaced passages 80 providing communications between the annular chamber 74 and that portion of the cylinder forward of the piston. A sealing cup 82 on the head controls the passages 80, and a spring 84 interposed between the sealing cup and the two-way valve serves to retain the cup and valve against displacement and also to return the piston to its retracted position and to move the shell from its seat on the resilient washer 22 against the resistance of the spring 64. The annular chamber 76 communicates with the reservoir only after the initial movement of the piston on its compression stroke, and a sealing cup 86 supported on the skirt 76 of the piston inhibits seepage of fluid from the cylinder.

A thrust pin 88, seated in the socket 78 and connected as by a flexible dust shield 90 to the open end of the sleeve, is suitably attached to a rod 92 pivoted to a foot pedal lever 94, rockable on a stub shaft 96, and connected by a retractile spring 98 to a fixed support 100.

In a normal operation, upon depressing the foot pedal lever 94, force is transmitted therefrom through the rod 92 and thrust pin 88 to the piston 66, resulting in movement of the piston 66 on its compression stroke.

During the initial movement of the piston on its compression stroke, the spring 64 becomes effective to move the shell 44 to its seat on the resilient washer 22. This action of the spring is augmented by friction introduced between the cup 82 on the piston and the wall of the shell 44 as the piston proceeds on its compression stroke, and also by pressure imposed on the fluid in the shell 44 acting on the head 46 of the shell. This results in closing the passage 56 between the shell and the wall of the cylinder and also to move the shell 44 from its seat on the sleeve 58 so as to establish communication between the passage 56 and the annular chamber 74 back of the head of the piston.

Thereafter, as the piston advances on its compression stroke, the fluid in the shell forward of the piston is displaced therefrom, past the two-way valve 28, through the port 26 and the fluid pressure delivery pipe 32 and its respective branches into the fluid pressure actuated motors 34, causing energization of the motors, resulting in actuation of the shoes 40 into engagement with the drums 38 against the resistance of the retractile springs 42.

Upon conclusion of a braking operation, the foot pedal lever 94 is released and returns to its retracted position under the influence of the retractile spring 100, carrying with it the rod 92 and the thrust pin 88. This results in release of the piston 66 and return of the piston to its retracted position under the influence of the retractile spring 84. As the piston returns to its retracted position, a partial vacuum is created in the shell 44, and this results in drawing fluid from the reservoir 10, through the port 30, into the passage 56, thence through the gap between the shell 44 and sleeve 58 into the annular chamber 74, thence through the passages 80 in the head of the piston, past the sealing cup 82, into the shell 44, completely filling the shell. As the piston nears its retracted position, it engages the stop 68 on the shell, and this results in moving the shell against the resistance of the spring 64 into abutting relation with the sleeve 58, thus closing the gap between the shell and the sleeve and also establishing communication between the shell and the passage 56.

During this operation, fluid is returning to the cylinder from the fluid pressure actuated motors 34, and the piping system connecting the motors, to the cylinder. Under this condition, the cylinder receives a quantity of fluid in excess of its capacity, and this excess fluid escapes through the passage 56 and port 30 into the reservoir. The valve 28 maintains a positive pressure on the fluid pressure delivery pipes and motors connected thereto, and in the event of expansion of fluid in the pipe lines and motors, due to temperature changes, the valve provides for the escape of the fluid so as to avoid excessive pressure. The escaping fluid flows through the passage 56 and port 30 into the reservoir.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid pressure producing device comprising a cylinder having an inlet port, a head on the cylinder having an outlet port, a shell slidable in the cylinder having a head provided with an opening registering with the outlet port, a sleeve fixedly secured in the cylinder, a resilient means between the sleeve and the shell urging the sleeve to seat on the head of the cylinder only during the compression stroke of the piston, and a piston reciprocable in the shell and sleeve.

2. A fluid pressure producing device comprising a cylinder having inlet and outlet ports, a valve controlling the outlet port, a shell reciprocable in the cylinder having a head provided with an opening receiving the valve and communicating with the outlet port, a sleeve fixedly secured in the cylinder, a spring interposed between the shell and sleeve, a piston reciprocable in the shell and sleeve, a stop on the shell for the piston, means for advancing the piston, and means for returning the piston to its retracted position.

3. A fluid pressure producing device comprising a cylinder having inlet and outlet ports, a valve controlling the outlet port, a shell reciprocable in the cylinder having a head provided with an opening receiving the valve and communicating with the outlet port, a fixed sleeve in the cylinder, a spring between the sleeve and shell, a piston reciprocable in the shell and sleeve, a stop on the sleeve, means for advancing the piston, and means for returning the piston to retracted position against the stop.

4. A fluid pressure producing device comprising a cylinder having an inlet port and a head provided with a discharge port, a shell supported for reciprocation in the cylinder in spaced relation to the bore thereof having a head provided with an opening registering with the discharge port, a fixed sleeve in the cylinder in abutting relation to the shell, a spring between the sleeve and the shell, a piston reciprocable in the shell and sleeve, a stop on the shell for the piston, means for advancing the piston, and means for returning the piston to retracted position.

5. A fluid pressure producing device comprising a cylinder having an inlet port and a head provided with a discharge port, a resilient washer on the head, a valve controlling the discharge port, a shell supported for reciprocation in the cylinder in spaced relation to the bore of the cylinder having a head adapted to seat on the washer provided with an opening receiving the valve and communicating with the discharge port, a sleeve fixedly secured in the cylinder in abutting relation to the shell, a spring interposed between the sleeve and shell, a piston reciprocable in the shell and sleeve, a stop on the shell for the piston, means for advancing the piston, and means for returning the piston to its retracted position against the resistance of the spring.

6. A fluid pressure producing device comprising a reservoir, a cylinder supplied therefrom open at one of its ends and closed at its other end by a head having a discharge port, a resilient washer on the head having an opening registering with the discharge port, a sleeve supported in the cylinder in spaced relation to the bore of the cylinder having a head adapted to seat on the resilient washer provided with an opening receiving the valve and registering with the discharge port, a sleeve secured in the open end of the cylinder in abutting relation to the shell, a spring between the sleeve and shell, a piston in the sleeve, a stop on the shell for the piston, means for by-passing fluid past the piston, sealing means on the piston, means for advancing the piston, and means for returning the piston to its retracted position.

7. A fluid pressure producing device comprising a reservoir, a cylinder supplied therefrom open at one of its ends and closed at its other end by a head provided with a discharge port, a resilient washer seated on the head having an opening therethrough registering with the discharge port, a valve controlling the discharge port, a shell supported for reciprocation in the cylinder in spaced relation to the bore of the cylinder having a head adapted to seat on the washer, said head having an opening therethrough receiving the valve and communicating with the discharge port, a sleeve secured in the open end of the cylinder in abutting relation to the shell, a spring between the sleeve and shell, a piston reciprocable in the shell and sleeve, a stop on the shell for the piston, and means for actuating the piston.

8. In fluid pressure apparatus, a support, a cylinder mounted on the support for limited reciprocable movement, means forming an outlet passage for the cylinder, a piston in said cylinder, means for normally positioning the piston at the rear of the cylinder and the cylinder at its rearward limit of movement, a reservoir, means comprising valve means associated with the outlet passage and controlled by the reciprocable movement of the cylinder for controlling communication between the reservoir and both the cylinder and outlet passage, means for moving the cylinder forward to close the valve means when the piston is moved forward, and means for creating a force proportional to the pressure being developed by the piston to hold the valve closed.

9. In fluid pressure apparatus, a support, a cylinder mounted on the support for limited reciprocable movement, means forming an outlet passage for the cylinder, a piston in said cylinder, means for normally positioning the piston at the rear of the cylinder and the cylinder at its rearward limit of movement, a reservoir, means including a valve element carried by the forward end of the cylinder and a cooperating valve element carried by the support for controlling communication between the reservoir and cylinder, means for closing said valve, and means maintaining the valve closed by a pressure proportional to the pressure being developed by the piston.

HARVEY C. SWIFT.